US012573011B2

(12) United States Patent
Tsuyama

(10) Patent No.: US 12,573,011 B2
(45) Date of Patent: Mar. 10, 2026

(54) APPARATUS THAT PERFORMS PROCESSING FOR NOISE REDUCTION AND METHOD

(71) Applicant: CANON KABUSHIKI KAISHA, Tokyo (JP)

(72) Inventor: Kazuya Tsuyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 298 days.

(21) Appl. No.: 18/365,096

(22) Filed: Aug. 3, 2023

(65) Prior Publication Data

US 2024/0046425 A1 Feb. 8, 2024

(30) Foreign Application Priority Data

Aug. 8, 2022 (JP) ................................. 2022-126502

(51) Int. Cl.
G06T 5/70 (2024.01)
G06T 5/50 (2006.01)
G06T 5/80 (2024.01)

(52) U.S. Cl.
CPC .................. G06T 5/70 (2024.01); G06T 5/50 (2013.01); G06T 5/80 (2024.01); *G06T 2207/20084* (2013.01); *G06T 2207/20224* (2013.01)

(58) Field of Classification Search
None
See application file for complete search history.

(56) References Cited

U.S. PATENT DOCUMENTS

| | | | |
|---|---|---|---|
| 12,205,352 B2 * | 1/2025 | Sugimoto | G06V 10/774 |
| 2021/0104313 A1 * | 4/2021 | Mizobe | G06N 3/0475 |
| 2021/0217171 A1 * | 7/2021 | Li | G06T 5/73 |
| 2021/0390696 A1 * | 12/2021 | Iwase | A61B 3/102 |
| 2023/0162328 A1 * | 5/2023 | Kobayashi | G06T 5/70 |
| | | | 382/155 |
| 2024/0273670 A1 * | 8/2024 | Cragg | G06T 5/77 |
| 2025/0045892 A1 * | 2/2025 | Mardani | G06T 5/70 |
| 2025/0232419 A1 * | 7/2025 | Lee | G06T 5/73 |

FOREIGN PATENT DOCUMENTS

| | | |
|---|---|---|
| JP | H10165365 A | 6/1998 |
| JP | 2020144489 A | 9/2020 |

* cited by examiner

*Primary Examiner* — Soo Shin
(74) *Attorney, Agent, or Firm* — Canon U.S.A., Inc. IP Division

(57) ABSTRACT

An apparatus includes at least one processor, and a memory coupled to the at least one processor storing instructions that, when executed by the at least one processor, cause the at least one processor to function as a first processing unit, a second processing unit, and a composition unit, wherein the first processing unit performs first processing on a first image to generate a second image, wherein the second processing unit performs second processing on the first image and the second image to generate a third image and a fourth image, and wherein the composition unit performs composition on the second image and the fourth image to generate a fifth image, performs composition on the first image and the third image to generate a sixth image, and performs composition on the fifth image and the sixth image to generate a seventh image.

11 Claims, 5 Drawing Sheets

Figure 5:
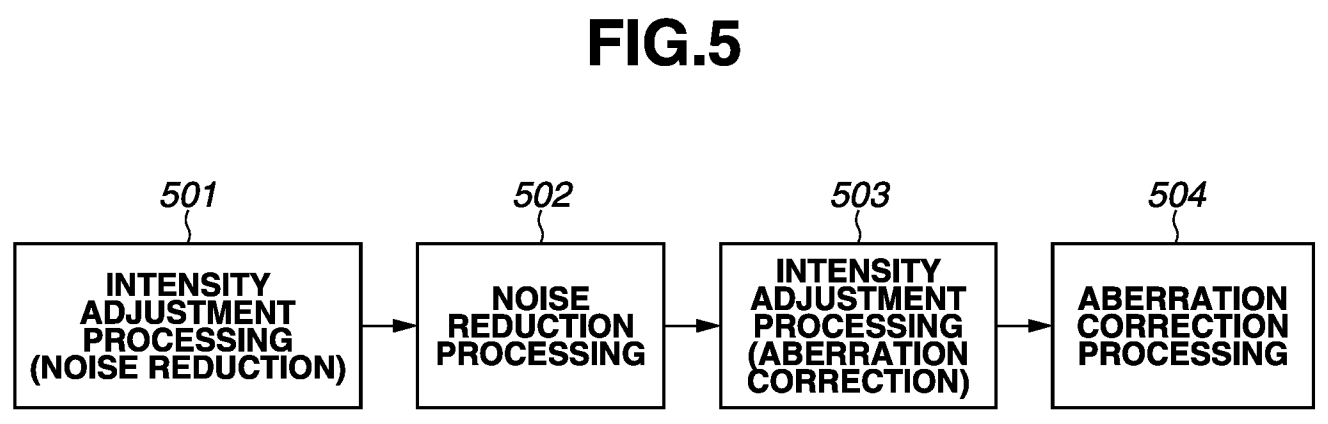

501 — INTENSITY ADJUSTMENT PROCESSING (NOISE REDUCTION)

502 — NOISE REDUCTION PROCESSING

503 — INTENSITY ADJUSTMENT PROCESSING (ABERRATION CORRECTION)

504 — ABERRATION CORRECTION PROCESSING

APPARATUS THAT PERFORMS PROCESSING FOR NOISE REDUCTION AND METHOD

BACKGROUND

Technical Field

The aspect of the embodiments relates to an apparatus, particularly to an apparatus that performs processing for noise reduction.

Description of the Related Art

Recently, techniques for performing image restoration processing have been discussed. For example, Japanese Patent Application Laid-Open No. 10-165365 discusses an in vivo imaging system that performs image restoration processing on an out-of-focus range. Further, Japanese Patent Application Laid-Open No. 2020-144489 discusses a method for performing image restoration processing using a neural network.

However, in a case where processing for reducing noise in an image is performed before image restoration processing, if intensity of processing in a previous stage is changed, a setting of processing in a subsequent stage needs to be performed again.

SUMMARY

According to an aspect of the embodiments, an apparatus includes at least one processor; and at least one memory coupled to the one or more processors storing instructions that, when executed by the one or more processors, cause the one or more processors to function as a first processing unit configured to perform first processing that is at least one of processing regarding noise reduction and processing regarding image restoration, a second processing unit configured to perform second processing that is at least one of the processing regarding noise reduction and the processing regarding image restoration, and a composition unit configured to perform composition, wherein the first processing unit performs the first processing on a first image to generate a second image, wherein the second processing unit performs the second processing on the first image and the second image to generate a third image and a fourth image, and wherein the composition unit performs the composition on the second image and the fourth image to generate a fifth image, performs the composition on the first image and the third image to generate a sixth image, and performs the composition on the fifth image and the sixth image to generate a seventh image.

Further features of the disclosure will become apparent from the following description of exemplary embodiments with reference to the attached drawings.

BRIEF DESCRIPTION OF THE DRAWINGS

FIG. 1 is a block diagram illustrating a configuration of an image capturing apparatus according to a first exemplary embodiment of the present invention.

FIG. 3 is a system diagram illustrating an image processing system according to a second exemplary embodiment of the present invention.

FIG. 5 is a system diagram illustrating processing for successively performing noise reduction processing and image restoration processing on an image.

DESCRIPTION OF THE EMBODIMENTS

Figure 2:
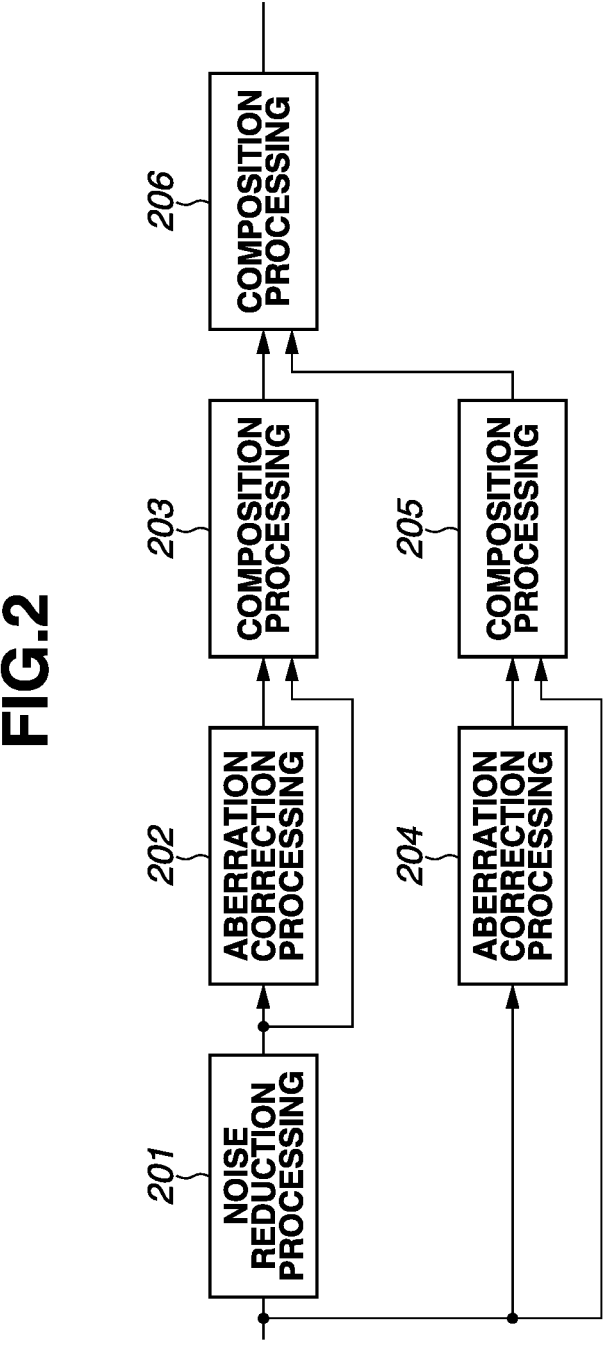
FIG. 2 is a system diagram illustrating an image processing system according to the first exemplary embodiment of the present invention.

Exemplary embodiments of the present invention will be described below with reference to the attached drawings. The exemplary embodiments described below are merely examples for implementing the present invention, and the present invention is not limited to the following exemplary embodiments.

Configuration of Image Capturing Apparatus

Figure 1:
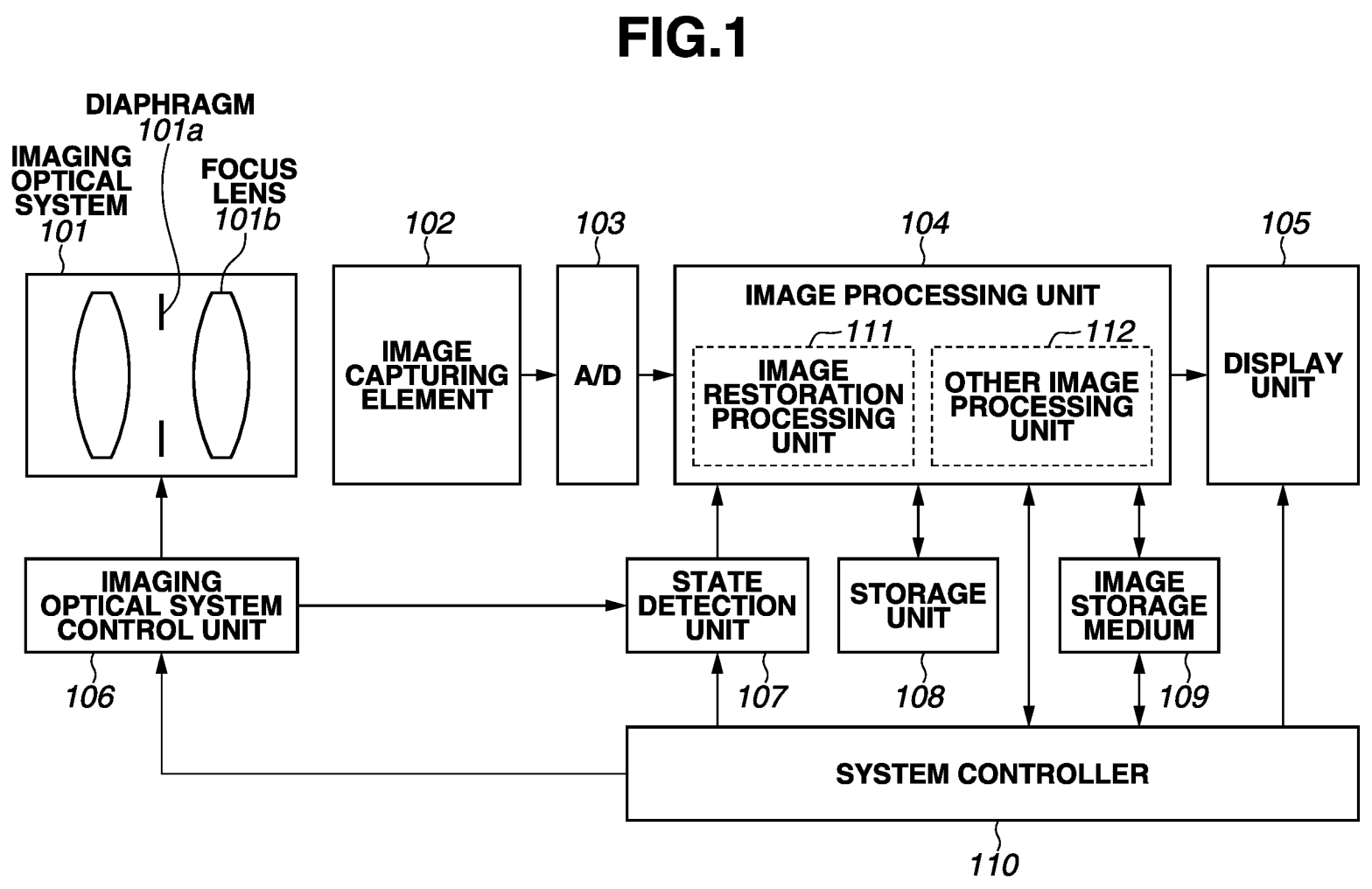

FIG. 1 is a block diagram illustrating a configuration of an image capturing apparatus according to a first exemplary embodiment.

An imaging optical system 101 forms an image of a subject (not illustrated) on an image capturing element 102. The image capturing element 102 converts image forming light into an electrical signal, and the electrical signal is then converted into a digital signal by an analog-to-digital (A/D) converter 103 and input to an image processing unit 104. The image processing unit 104 includes an image restoration processing unit 111 and an image processing unit 112 that performs predetermined processing. The image processing unit 104 first acquires information about an imaging state of the image capturing apparatus from a state detection unit 107. The state detection unit 107 can acquire state information directly from a system controller 110, or can also acquire, for example, imaging state information about the imaging optical system 101 from an imaging optical system control unit 106. Next, the image restoration processing unit 111 selects an image restoration filter depending on the imaging state from a storage unit 108 and performs image restoration processing on the image input to the image processing unit 104 using the image restoration filter. The image restoration processing unit 111 is described in detail below. Data to be stored in the storage unit 108 needs not be the image restoration filter and can be information about an optical transfer function (OTF) to generate the image restoration filter. In a case where the information about the OTF is stored in the storage unit 108, the image restoration processing unit 111 selects the information about the OTF depending on the imaging state from the storage unit 108. The image restoration processing unit 111 generates the image restoration filter depending on the imaging state and then performs image restoration processing on the image input to the image processing unit 104. The other image processing unit 112 performs predetermined image processing, such as gamma correction and color balance adjustment, on the image to generate an image file in a Joint Photographic Experts Group (JPEG) format or the like.

The image processing unit 104 stores the processed output image in an image storage medium 109 in a predetermined format. A display unit 105 may display an image acquired by performing predetermined display processing on the image subjected to the image restoration processing or may display an image that is not subjected to the image restoration processing or an image that is subjected to simple restoration processing.

The system controller 110 performs a series of control processes, and the imaging optical system control unit 106 mechanically drives the imaging optical system 101 according to an instruction from the system controller 110.

A diaphragm 101a controls an aperture diameter as an imaging state setting of an F number. A focus lens 101b controls a position of the lens by an autofocus (AF) mechanism and a manual focus mechanism, which are not illustrated, to adjust the focus according to a distance to the subject. The imaging optical system 101 may include an optical element, such as a low-pass filter and an infrared ray cut filter. In a case of using an element that has an effect on the characteristics of the OTF, such as the low-pass filter, in one embodiment, it may be necessary to consider the effect at the time of creating the image restoration filter. The infrared ray cut filter also has an effect on each point spread function (PSF) of red, green, and blue (RGB) channels, which is an integrated value of the PSF of a spectral wavelength, especially on the PSF of the R channel, so that it may be also necessary to consider the effect at the time of creating the image restoration filter. The imaging optical system 101 is configured as a part of the image capturing apparatus. However, in a case where the image capturing apparatus is an interchangeable lens camera, such as a single lens reflex camera, a part of the imaging optical system 101 is configured outside the image capturing apparatus.

Image Restoration Processing

Image restoration according to the present exemplary embodiment is briefly described.

When an image of a subject is formed on the image capturing element 102 through the imaging optical system 101, the obtained image is degraded to no small extent by an aberration of the imaging optical system 101 in particular.

A blur component of an image is caused by a spherical aberration, a coma aberration, a curvature of field, astigmatism, and the like of the optical system. In a case where there is no aberration and there is no influence of diffraction, a light flux emitted from one point of a subject is converged again to one point on an imaging plane. The blur component of the image caused by the aberration refers to a phenomenon in which a light flux emitted from one point of a subject spreads widely without being converged to one point on the imaging plane and forms an image. The blur component can be optically evaluated using the PSF. A blur of an image includes, for example, a blur in an out-of-focus image. However, in the present exemplary embodiment, a blur of an image includes a blur in an image that is caused by the above-described aberrations of the optical system even if the image is in focus. Color bleeding in a color image caused by an axial chromatic aberration, a chromatic spherical aberration, and a chromatic coma aberration of the optical system is due to a difference in blurring between wavelengths of light. As for a color shift in a lateral direction caused by a magnification chromatic aberration of the optical system, it can also be said that the color shift is a position shift or a phase shift due to a difference in imaging magnification between wavelengths of light.

The OTF, which is obtained by performing Fourier transform on the PSF, is frequency component information of the aberration and is expressed by a complex number. An absolute value of the OTF, i.e., an amplitude component, is referred to as a modulation transfer function (MTF), and a phase component is referred to as a phase transfer function (PTF). The MTF and the PTF respectively represent frequency characteristics of the amplitude component and the phase component of image degradation due to aberration. In the present exemplary embodiment, the phase component is represented by the following equation as a phase angle. Re(OTF) and Im(OTF) respectively represent a real part and an imaginary part of the OTF.

As expressed in Equation 1, the OTF of the imaging optical system degrades the amplitude component and the phase component of the image, so that each point of the subject in the degraded image is asymmetrically blurred like the coma aberration.

$$PTF = \arctan(Im(OTF)/Re(OTF)) \quad \text{Equation 1}$$

The magnification chromatic aberration occurs in a case where an image forming position is shifted due to a difference in image forming magnification between wavelengths of light, and an image is formed according to spectral characteristics of the image capturing apparatus, for example, RGB color components. Accordingly, in addition to the shift in the image formation positions among RGB images, the spread of the image occurs due to the shift in the image formation position for each wavelength, i.e., the phase shift, in each color component. Thus, strictly speaking, the magnification chromatic aberration is not just a chromatic aberration caused by a parallel shift, but according to the present exemplary embodiment, the chromatic aberration is used synonymously with the magnification chromatic aberration unless otherwise specified.

As a method for correcting degradation in the amplitude (MTF) and the phase (PTF), a method using OTF information of the imaging optical system is known. The method using the OTF information is referred to as image recovery and image restoration, and in the following description of the present exemplary embodiment, processing for correcting image degradation using the OTF information of the imaging optical system is described as image restoration processing or restoration processing.

Next, an outline of image restoration processing is described. The following Equation 2 holds, where g(x, y) is a degraded image, f(x, y) is an original image, and h(x, y) is the PSF obtained by performing inverse Fourier transform on the above-described optical transfer function.

$$g(x,y) = h(x,y) * f(x,y) \quad \text{Equation 2}$$

In Equation 2, "*" indicates convolution, and (x, y) indicates coordinates on the image.

If Equation 2 is Fourier transformed and converted into a form for display in a frequency plane, it is expressed in a product form for each frequency as in Equation 3 below.

$$G(u,v) = H(u,v) \cdot F(u,v) \quad \text{Equation 3}$$

In Equation 3, H is obtained by performing Fourier transform on the PSF and thus is the OTF, and (u, v) is coordinates in a two-dimensional frequency plane. That is, (u, v) indicates frequency.

In order to acquire the original image from the captured degraded image, both sides of Equation 3 are divided by H, and the following Equation 4 is obtained.

$$G(u,v)/H(u,v) = F(u,v) \quad \text{Equation 4}$$

The original image f(x, y) is acquired as a restored image by performing inverse Fourier transform on F(u, v) in Equation 4 and restoring it onto a real plane.

Here, if R is the result obtained by performing inverse Fourier transform on 1/H in the above-described equation, the original image can be acquired in the similar way by performing convolution processing on the image on the real plane as expressed in the following Equation 5.

$$g(x,y) * R(x,y) = f(x,y) \quad \text{Equation 5}$$

R(x, y) in Equation 5 is referred to as an image restoration filter. An actual image contains a noise component, so that if the image restoration filter generated using a complete reciprocal of the OTF as described above is used, the noise component is amplified together with the degraded image, and generally a good image cannot be acquired. As to noise amplification, there is a known method, such as a Wiener filter, that suppresses a restoration rate on a high frequency side of an image according to an intensity ratio of an image signal to a noise signal. As a method for correcting degradation of a color bleeding component in an image, for example, if the amount of blur of each color component of the image is equalized by the above-described blur component correction, the correction is considered completed.

The OTF varies depending on the imaging state, such as a zoom position state and the state of an aperture diameter, so that the image restoration filter is changed to be used for image restoration processing accordingly.

FIG. 5 is a system diagram illustrating processing for successively performing noise reduction processing and image restoration processing on an image. An image processing apparatus performs intensity adjustment processing 501 for noise reduction on an image and then performs noise reduction processing 502 on the image. The image processing apparatus further performs intensity adjustment processing 503 for aberration correction and performs aberration correction processing 504 on the image subjected to the noise reduction processing 502. In this case, there is an issue that if a setting of the intensity adjustment processing 501 is changed, a setting of the intensity adjustment processing 503 also needs to be changed.

Image Processing System

Next, a flow of image processing according to the present exemplary embodiment is described with reference to FIG. 2.

FIG. 2 is a system diagram illustrating an image processing system according to the present exemplary embodiment.

The image processing unit 104 first performs noise reduction processing 201 on an input image and then performs aberration correction processing 202 on the image. Next, the image processing unit 104 performs composition processing 203 on the image subjected to the noise reduction processing 201 and the image subjected to the aberration correction processing 202. The image processing unit 104 adjusts a composition ratio in the composition processing 203 and thus can adjust intensity of aberration correction. The image processing unit 104 also performs aberration correction processing 204 on the input image and performs composition processing 205 on the image subjected to the aberration correction processing 204 and the image that is not subjected to the aberration correction processing 204. In this case, the image processing unit 104 also adjusts a composition ratio in the composition processing 205 and thus can adjust the intensity of aberration correction. Finally, the image processing unit 104 performs composition processing 206 on the image subjected to the composition processing 203 and the image subjected to the composition processing 205.

The image processing unit 104 adjusts a composition ratio in the composition processing 206 and thus can adjust intensity of the noise reduction processing.

As described above, the image processing unit 104 adjusts the composition ratio and thus can adjust the intensity of the noise reduction processing and the intensity of the aberration correction. Even if a setting of the aberration correction processing 202 or the aberration correction processing 204 is changed, the intensity of the noise reduction processing can be corrected by adjusting the composition ratio in the composition processing 206.

The order of processing described above is merely an example, and the noise reduction processing may be performed in a previous stage, and the aberration correction processing may be performed in a subsequent stage.

According to the present exemplary embodiment, in a case where the noise reduction processing and the aberration correction processing are successively performed, the intensity to be applied to the noise reduction processing and the intensity to be applied to the aberration correction processing can be adjusted without executing the processing in the subsequent stage again.

A second exemplary embodiment according to the present invention is described below with reference to FIG. 3. Unlike the first exemplary embodiment, the second exemplary embodiment is characterized in that configuration processing in the subsequent stage is performed once.

Figure 3:
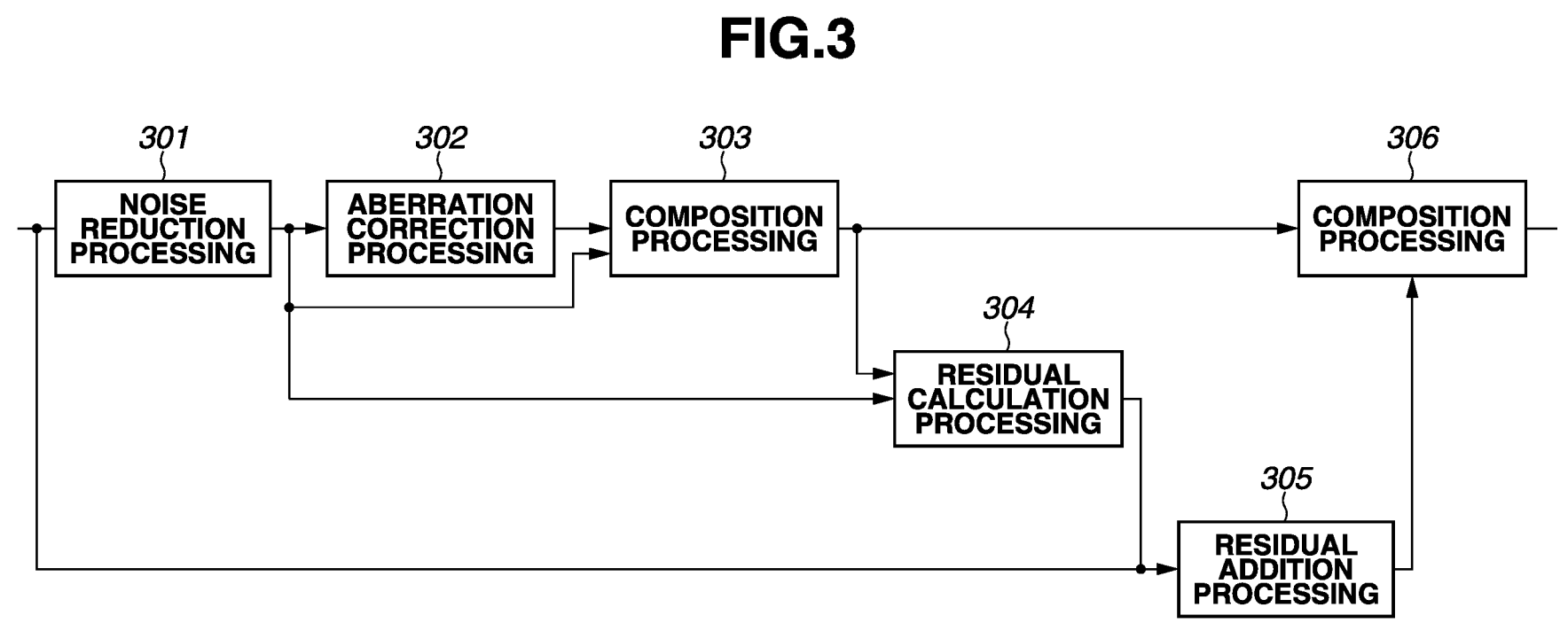

FIG. 3 is a system diagram illustrating an image processing system according to the present exemplary embodiment.

The image processing unit 104 performs noise reduction processing 301 on an input image and performs aberration correction processing 302 on the image subjected to the noise reduction processing 301. Next, the image processing unit 104 performs composition processing 303 on the image subjected to the noise reduction processing 301 and the image subjected to the aberration correction processing 302.

Then, the image processing unit 104 performs residual calculation processing 304 on the input image and the image subjected to the composition processing 303. In the residual calculation processing 304, the image processing unit 104 calculates a difference in signals between the input image and the image subjected to the composition processing 303. The difference in signals calculated by the image processing unit 104 in the residual calculation processing 304 can be regarded as an aberration correction component by the aberration correction processing with intensity adjustment taken into account.

Further, the image processing unit 104 performs residual addition processing 305 on the input image and the image subjected to the residual calculation processing 304. In the residual addition processing 305, the image processing unit 104 performs addition of image signals of the input image and the image subjected to the residual calculation processing 304. The image acquired by the addition of the image signals in the residual addition processing 305 by the image processing unit 104 can be regarded as an image equivalent to an image acquired by performing the aberration correction processing and the intensity adjustment for the aberration correction on the input image.

Finally, the image processing unit 104 performs composition processing 306 on the image acquired by the residual addition processing 305 and the image acquired by the composition processing 303. The image processing unit 104 adjusts a composition ratio in the composition processing 306 and thus can adjust the intensity of the noise reduction processing.

According to the first exemplary embodiment, the processing in the subsequent stage is executed twice, but according to the present exemplary embodiment, residual signals before and after the correction are acquired and added, so that the intensity to be applied to the processing in the previous stage and the intensity to be applied to the processing in the subsequent stage can be adjusted by executing the processing in the subsequent stage once.

According to the present exemplary embodiment, the noise reduction processing may be performed first, and then the aberration correction processing may be performed, as in the first exemplary embodiment.

According to the second exemplary embodiment, in a case where the noise reduction processing and the aberration correction processing are successively performed, the intensity to be applied to the noise reduction processing and the intensity to be applied to the aberration correction processing can be adjusted without executing the processing in the subsequent stage again.

A third exemplary embodiment according to the present invention is described below with reference to FIG. 4. The third exemplary embodiment is characterized in that restoration processing for restoring degradation information caused by noise reduction processing is performed.

According to the second exemplary embodiment, in a case where a correction component for the aberration correction processing is acquired, an aberration correction component is acquired from the image subjected to the noise reduction processing, so that an aberration correction component for a high frequency component in a low contrast area in the image, which is lost by the noise reduction processing, cannot be acquired. Thus, a correction component for the high frequency component in the low contrast area, which is lost by the noise reduction processing, cannot be contained in the image subjected to the aberration correction that is generated in a pseudo manner by adding residual components. As a result, even if composition is performed with intensity adjustment taken into account, the resolution of a high frequency band in the low contrast area in the composite output image is lowered. For the above-described reason, the output image according to the second exemplary embodiment may have a low quality in the high frequency band in the low contrast area compared with the output image according to the first exemplary embodiment.

Figure 4:
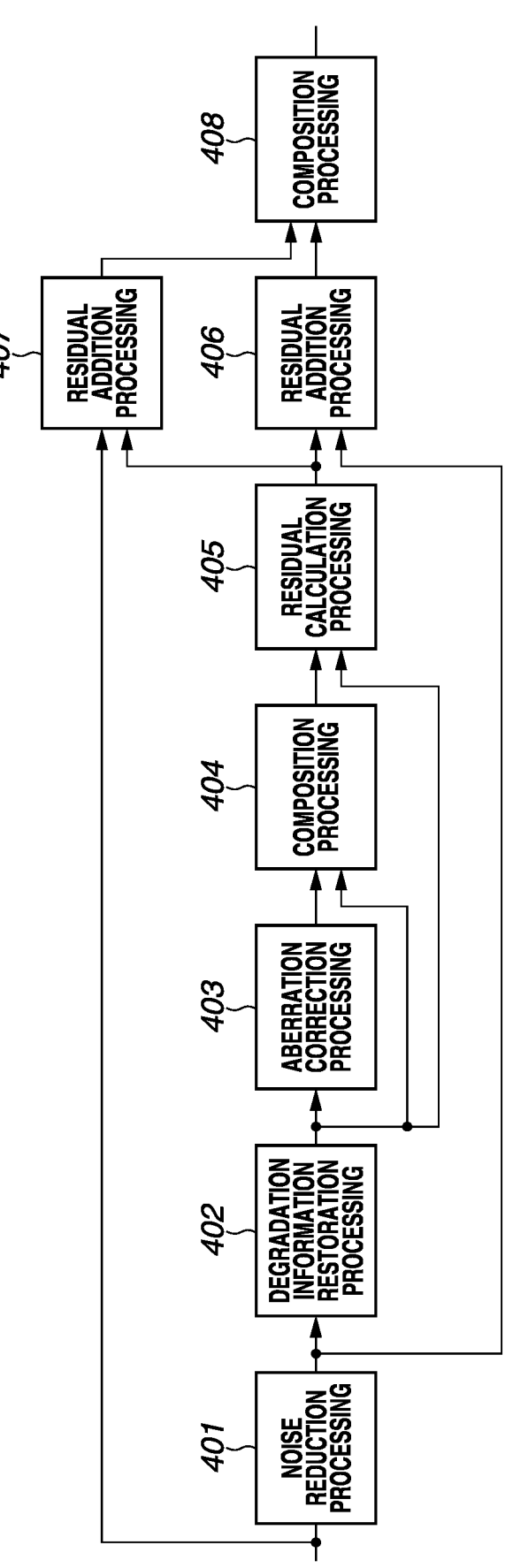
FIG. 4 is a system diagram illustrating an image processing system according to a third exemplary embodiment of the present invention.

FIG. 4 is a system diagram illustrating an image processing system according to the present exemplary embodiment.

The image processing unit 104 performs noise reduction processing 401 on an input image.

Next, the image processing unit 104 performs restoration processing 402 for degradation information caused by the noise reduction processing on the image subjected to the noise reduction processing 401.

Further, the image processing unit 104 performs aberration correction processing 403 on the image subjected to the restoration processing 402 for the degradation information caused by the noise reduction processing. Then, the image processing unit 104 performs composition processing 404 on the image subjected to the restoration processing 402 for the degradation information caused by the noise reduction processing and the image subjected to the aberration correction processing 403. The image processing unit 104 adjusts a composition ratio in the composition processing 404 and thus adjusts the intensity of the aberration correction.

The image processing unit 104 performs residual calculation processing 405 on the image acquired by the composition processing 404 and the image subjected to the restoration processing 402 for the degradation information caused by the noise reduction processing. Further, the image processing unit 104 performs residual addition processing 406 on the image acquired by the residual calculation processing 405 and the image acquired by the noise reduction processing 401. The image processing unit 104 also performs residual addition processing 407 on the image acquired by the residual calculation processing 405 and the input image. In the residual calculation processing 405, the image processing unit 104 calculates a difference between the image on which the noise reduction, the restoration of degradation information caused by the noise reduction processing, the aberration correction, and the adjustment of the intensity of the aberration correction are performed and the image on which the noise reduction and the restoration of high frequency information are performed, and acquires a correction component by the aberration correction. In the residual calculation processing 405, the image processing unit 104 performs the processing on the image subjected to the restoration processing 402 for the degradation information caused by the noise reduction processing and thus can acquire the correction component containing a correction component for the high frequency component in the low contrast area that is degraded by the noise reduction processing. In the residual addition processing 406, the image processing unit 104 adds the image subjected to the noise reduction processing and the residual signal acquired by the residual calculation processing 405 and thus can acquire the image subjected to the noise reduction, the aberration correction, and the adjustment of the intensity of the aberration correction.

In the residual addition processing 407, the image processing unit 104 adds the residual signal acquired by the residual calculation processing 405 to the input image and thus can acquire the image subjected to the aberration correction and the adjustment of the intensity of the aberration correction.

Finally, the image processing unit 104 performs composition processing 408 on the image acquired by the residual addition processing 406 and the image acquired by the residual addition processing 407. The image processing unit 104 adjusts a composition ratio in the composition processing 408 and thus can adjust the intensity of the noise reduction processing.

According to the third exemplary embodiment, in a case where the noise reduction processing and the aberration correction processing are successively performed, the intensity to be applied to the noise reduction processing and the intensity to be applied to the aberration correction processing can be adjusted without executing the processing in the subsequent stage again, and the quality in the high-frequency texture in the low contrast area can be maintained.

Other Exemplary Embodiments

The image processing such as the noise reduction processing and the aberration correction processing according to the above-described exemplary embodiments can be implemented by a method of deep learning using a neural network.

The "image capturing apparatus" according to the above-described exemplary embodiments can be applied not only to a digital camera for personal use, but also a portable device, a smartphone, and a network camera.

The present invention can be realized by processing for supplying a program for implementing one or more functions of the above-described exemplary embodiments to a system or an apparatus via a network or a storage medium and causing one or more processors in a computer of the system or the apparatus to read and execute the program. The present invention can also be realized by a circuit (for example, an application specific integrated circuit (ASIC)) for implementing the one or more functions of the above-described exemplary embodiments.

According to the exemplary embodiments of the present invention, in a case where noise reduction processing and image restoration processing are successively performed, intensity to be applied to processing in a previous stage can be changed without executing processing in a subsequent stage again.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-126502, filed Aug. 8, 2022, which is hereby incorporated by reference herein in its entirety.

What is claimed is:

1. An apparatus comprising:
at least one processor; and
a memory coupled to the at least one processor storing instructions that, when executed by the at least one processor, cause the at least one processor to function as:
a first processing unit configured to perform first processing that is at least one of processing regarding noise reduction and processing regarding image restoration;
a second processing unit configured to perform second processing that is at least one of the processing regarding noise reduction and the processing regarding image restoration; and
a composition unit configured to perform composition,
wherein the first processing unit performs the first processing on a first image to generate a second image,
wherein the second processing unit performs the second processing on the first image and the second image to generate a third image and a fourth image, and
wherein the composition unit performs the composition on the second image and the fourth image to generate a fifth image, performs the composition on the first image and the third image to generate a sixth image, and performs the composition on the fifth image and the sixth image to generate a seventh image.

2. The apparatus according to claim 1,
wherein, in a case where the first processing unit performs the processing regarding noise reduction, the second processing unit performs the processing regarding image restoration, and
wherein, in a case where the first processing unit performs the processing regarding image restoration, the second processing unit performs the processing regarding noise reduction.

3. The apparatus according to claim 1, wherein the processing regarding image restoration is processing for aberration correction.

4. The apparatus according to claim 1, wherein the composition unit adjusts intensity of at least one of the processing regarding noise reduction and the processing regarding image restoration by adjusting a composition ratio to be used for the composition.

5. The apparatus according to claim 1,
wherein the first processing unit performs the first processing by a deep learning method using a neural network, and
wherein the second processing unit performs the second processing by the deep learning method using the neural network.

6. An apparatus comprising:
a sensor configured to capture a first image;
at least one processor; and
a memory coupled to the at least one processor storing instructions that, when executed by the at least one processor, cause the at least one processor to function as:
a first processing unit configured to perform first processing that is at least one of processing regarding noise reduction and processing regarding image restoration;
a second processing unit configured to perform second processing that is at least one of the processing regarding noise reduction and the processing regarding image restoration; and
a composition unit configured to perform composition,
wherein the first processing unit performs the first processing on the first image to generate a second image,
wherein the second processing unit performs the second processing on the first image and the second image to generate a third image and a fourth image, and
wherein the composition unit performs the composition on the second image and the fourth image to generate a fifth image, performs the composition on the first image and the third image to generate a sixth image, and performs the composition on the fifth image and the sixth image to generate a seventh image.

7. A method, comprising:
performing first processing that is at least one of processing regarding noise reduction and processing regarding image restoration;
performing second processing that is at least one of the processing regarding noise reduction and the processing regarding image restoration; and
performing composition,
wherein the first processing is performed on a first image to generate a second image,
wherein the second processing is performed on the first image and the second image to generate a third image and a fourth image, and
wherein the composition is performed on the second image and the fourth image to generate a fifth image, is performed on the first image and the third image to generate a sixth image, and is performed on the fifth image and the sixth image to generate a seventh image.

8. The method according to claim 7, wherein, in a case where the first processing performs the processing regarding noise reduction, the second processing performs the processing regarding image restoration, and wherein, in a case where the first processing performs the processing regarding image restoration, the second processing performs the processing regarding noise reduction.

9. The method according to claim 7, wherein the processing regarding image restoration is processing for aberration correction.

10. The method according to claim 7, wherein the performing composition adjusts intensity of at least one of the processing regarding noise reduction and the processing regarding image restoration by adjusting a composition ratio to be used for the composition.

11. The method according to claim 7, wherein the first processing performs the first processing by a deep learning method using a neural network, and wherein the second processing performs the second processing by the deep learning method using the neural network.

\* \* \* \* \*